United States Patent Office 3,178,432
Patented Apr. 13, 1965

3,178,432
NEW 2-SUBSTITUTED PYRIMIDINES
Jean Druey, Riehen, Paul Schmidt, Therwil, and Kurt Eichenberger and Max Wilhelm, Basel, Switzerland, assignors to Ciba Corporation, a corporation of Delaware
No Drawing. Filed Dec. 3, 1958, Ser. No. 777,847
Claims priority, application Switzerland, Dec. 6, 1957, 53,511; Oct. 3, 1958, 64,626
10 Claims. (Cl. 260—256.4)

This invention provides pyrimidines (and methods for their preparation) having the nucleus of the formula

or its tautomeric forms, which pyrimidines contain in the 2-position an at least monosubstituted amino group, in the 4-position a free, esterified or etherified hydroxyl group or a free or substituted mercapto or amino group, and in the 5-position a free or functionally converted carboxyl group, and salts of these compounds.

In these new compounds the at least monosubstituted amino group in the 2-position and a substituted amino group in the 4-position are, more especially, amino groups which are mono-or di-substituted by lower aliphatic, cycloaliphatic, aromatic, heterocyclic, araliphatic or heterocyclyl-aliphatic radicals. Examples of such groups are mono- or di-alkyl (particularly lower alkyl) amino groups, such as mono- or di-methylamino, mono- or di-ethylamino, mono- or di-propylamino or mono- or di-butylamino groups; alkylene-amino groups in which the alkylene radical is preferably lower alkylene and may be interrupted by heteroatoms, such as oxygen, sulfur or nitrogen, such as pyrrolidino (5 membered) and piperidino, morpholino or piperazino (6 membered) groups; aminoalkylamino groups, in which the terminal amino group is advantageously one of the amino groups mentioned above, and in which the alkylene radical advantageously contains 2–6 carbon atoms, such as the dimethylamino- or diethylamino-ethyl or -propyl group or a 5 or 6 membered heterocyclyl lower alkyl group, such as pyrrolidino-, piperidino-, morpholino- or piperazino-ethyl or -propyl group; hydroxyalkylamino (such as hydroxy-lower alkylamino) groups, such as the mono- or di-hydroxyethylamino group; cycloalkylamino groups especially those containing 5 to 6 ring carbon atoms; carbocyclic aromatic or aryl lower alkyl groups, such as benzylamino or phenylamino groups; or a furfurylamino group.

An esterified hydroxyl group in the 4-position is above all a halogen atom, for example, chlorine or bromine, an etherified hydroxyl group is especially a lower alkoxy group, for example, a methoxy group, or an aminoalkoxy group, of which the amino group may be, for example, one of those mentioned above. As an etherified mercapto group in the 4-position there may be mentioned more especially a lower alkyl mercapto group, such as the methyl mercapto group, or an aminoalkyl mercapto group, especially an amino lower alkyl mercapto group, in which the amino group is, for example, one of those mentioned above.

The amino group in the 4-position may also be an inorganically substituted amino group, such as a hydrazino group.

Functionally converted carboxyl groups in 5-position of the new pyrimidines are especially carboxylic acid ester groups, such as carbalkoxy groups, particularly carbo lower alkoxy for example carbethoxy groups, or amide, thioamide or nitrile groups.

The new compounds may contain further substituents. Thus, they may be substituted in the 6-position by a lower hydrocarbon radical, for example, lower alkyl, such as methyl, or by a group of the kind mentioned in the 4-position. If the new compounds contain in the 6-position a hetero-substituent bound by a double bond, such as an oxo group, they may also be substituted in the 1-position, for example, by a lower alkyl or amino lower alkyl group.

The new compounds possess valuable properties.

They possess diuretic, coronary dilatating, analgesic, antirheumatic, antibacterial and fungicidal properties. They are also effective against virus. They are therefore useful as medicaments.

The new compounds are also useful as intermediate products. Thus the 4-halogen-, 4-mercapto- or 4-alkylmercapto compounds can be condensed to form the corresponding 3-substituted pyrazolo[3,4-d]pyrimidines by reaction with hydrazines as described in our patent application No. 777,846, filed December 3, 1958, and now abandoned and in our patent application No. 777,859, filed December 3, 1958, and now abandoned. These pyrazolo[3,4-d]pyrimidines are valuable medicaments having the actions mentioned above.

Especially valuable are 1:3:6-unsubstituted-5-cyano-pyrimidines, which contain in the 2- and 4-positions an amino group of the kind described above, and especially 2:4-bis-dimethylamino-5-cyano-pyrimidine of the formula

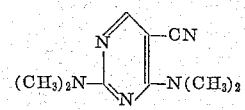

These compounds have a remarkable effect in virus-infections, such as for example ectromelia virus.

The new compounds can be made by methods in themselves known. Advantageously a compound, which is substituted in two of the positions 2, 4 and 5 by substituents desired in the final products and contains in the third of these positions a substituent convertible into the group desired in the final product, is treated so to convert the latter substituent. Advantageously, a pyrimidine, which is substituted in the 4- and 5-positions in the manner described above and contains in the 2-position a substituent exchangeable for an amino group, for example a halogen atom or a free or etherified mercapto group, is reacted with an amine.

In another process the pyrimidine ring is synthesized by a method in itself known from compounds containing the substituents desired in the end products. Thus, for example, a monosubstituted guanidine may be reacted with an α-cyano-β-oxo-propionic acid or its functional reactive oxo and/or acid derivative whereby the corresponding 4-hydroxy- or amino-5-cyano-pyrimidine containing in the 2-position a monosubstituted amino group is obtained.

Functional acid derivatives of α-cyano-β-oxopropionic acids used as starting materials, especially of α-cyano-α-formylacetic acid or α-cyano-α-acylacetic acids, for example of α-cyano-α-lower alkanoylacetic acids, are above all esters, such as lower alkyl esters, amides, thioamides, amidines or the nitrile. Functional oxo derivatives are above all enol ethers. Primarily there are used alkoxymethylene-cyanacetic acid-lower alkyl esters, such as ethoxymethylene-cyanacetic acid ethyl ester, and also the corresponding amides or nitriles, such as ethoxymethylene-malonitrile.

In a compound obtained by the above processes the substituents in the 2-, 4- and/or 5-positions may be converted in the usual manner into substituents of the kind hereinbefore indicated. Thus, for example, a free carboxyl group in the 5-position may be functionally converted, for example, by amidation or esterification. Alternatively, a functional carboxylic acid derivative may be converted into another derivative, for example, a nitrile into an amide, thioamide or ester, or an ester into an amide, or a functional carboxylic acid derivative into the free carboxylic acid. Similarly substituents in the 4-position may be converted from one into the other. As examples of such conversions there may be mentioned the halogenation of a hydroxyl group, for example, with a halide of phosporic acid, such as phosphorus oxychloride or phosphorus pentabromide, the etherification of a hydroxyl or mercapto group, for example, with a reactive ester of an alcohol, such as a halide, sulfate or sulfonate thereof, the sulfuration of a hydroxyl group, for example, with phosphorus penta-sulfide, the exchange of a halogen atom for an amino group, for example, by reaction with ammonia or an amine, the exchange of a halogen atom for a free mercapto or an etherified hydroxyl or etherified mercapto group, for example, by reaction with a metal mercaptide, metal mercaptan or metal alcoholate (the metal in each case being preferably an alkali group metal such as sodium or potassium and the alcohol substituent being preferably derived from a lower alkanol, such as methanol or ethanol) and the exchange of a free or etherified mercapto group for an amino group, for example, by reaction with ammonia or an amine.

Furthermore substituents may be introduced in the usual manner into the 1- and/or 6-positions of the compounds so obtained, or substituents present in those positions may be converted or replaced by hydrogen. This applies more especially, for example, to a hydroxyl group in the 6-position which may be exchanged for a halogen atom or a thio or amino group. Furthermore, for example, a substituent may be introduced into the 1-position, provided that there is present in the 6-position, for example, an oxo group. Thus, a lower alkyl or amino alkyl group may be introduced, for example, by treatment with a reactive ester of the appropriate alcohol; or halogen atoms or thio groups in the 6-position may be exchanged in known manner for hydrogen.

These conversions may be carried out singly or in combination.

The aforesaid reactions are carried out in the presence or absence of a diluent and/or condensing agent, if desired at a raised temperature, and under atmospheric or superatmospheric pressure.

The invention also includes any modification of the process in which there is used as starting material a compound obtainable as an intermediate product at any stage of the process and the remaining process steps are carried out or the process may be interrupted at any stage, or the reactions may be carried out in stages.

Depending on the particular process used the new compounds are obtained in the free form or in the form of salts thereof. When the compounds possess an acid character they may be converted into metals salts or salts with bases. There may be mentioned more especially the alkali metal and alkaline earth metal salts of carboxylic acids. When the compounds are of basic character they form salts with inorganic or organic acids. As salt-forming acids there may be mentioned, for example, hydrohalic acids, sulfuric acids, phosphoric acids, nitric acid, perchloric acid; aliphatic, alicyclic, aromatic or heterocyclic carboxylic or sulfonic acids, such as formic acid, acetic acid, propionic acid, oxalic acid, succinic acid, glycollic acid, lactic acid, malic acid, tartaric acid, citric acid, ascorbic acid, oxymaleic acid, dioxymaleic acid or pyroracemic acid; phenyl-acetic acid, benzoic acid, para-aminobenzoic acid, anthranilic acid, para-hydroxybenzoic acid, salicylic acid or para-aminosalicylic acid; methane sulfonic acid, ethane sulfonic acid, hydroxyethane sulfonic acid, ethylene sulfonic acid; toluene sulfonic acid, naphthalene sulfonic acids or sulfanilic acid, methionine, tryptophane, lysine or arginine.

The starting materials are known or can be made by methods in themselves known. There are advantageously used those starting materials which lead to the formation of the final products mentioned above as being especially valuable.

The new compounds, their salts or mixtures thereof can be used, for example, in the form of pharmaceutical preparations. These preparations contain the compound in admixture with a pharmaceutical organic or inorganic carrier, suitable for enteral, parenteral or topical administration. As carriers there are used substances which do not react with the new compounds, for example, water, gelatine, lactose, starches, magnesium stearate, talc, vegetable oils, benzyl alcohols, gums, polyalkylene glycols, cholesterol or other known carrier for medicaments. The pharmaceutical preparations may be, for example, in the form of tablets, dragees, or in liquid form as solutions, suspensions or emulsions. If desired they may be sterilized and/or may contain auxiliary substances, such as preserving, stabilizing, wetting or emulsifying agents. They may also contain other therapeutically valuable substances. The preparations are made up by the usual methods.

The following examples illustrate the invention:

*Example 1*

8 grams of 2-methylmercapto-4-hydroxy-5-cyano-pyrimidine are heated with 12.7 grams of para-chloraniline for 10 hours in a bath at 160–170° C. The reaction mixture is recrystallized from dimethyl-formamide. 2-para-chloranilino-4-hydroxy-5-cyano-pyrimidine of the formula

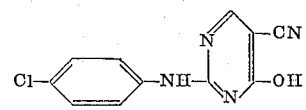

is thus obtained in yellow crystals melting at 280–282° C.

The 2-methylmercapto-4-hydroxy-5-cyano-pyrimidine used as starting material is prepared in the following manner:

11.2 grams of potassium hydroxide and 70 cc. of methanol are cooled to 0° C., and then a solution of 44 grams of S-methyl-isothiourea in 200 cc. of methanol is added. The whole is filtered with suction to remove the precipitated potassium iodide, 33 grams of ethoxymethylene-cyanoacetic acid ester are added to the filtrate, and the temperature is maintained between 8 and 12° C., the yellow precipitate is filtered off and washed with cold methanol and ether. The S-methyl-isothioureido-methylene-cyanacetic acid ester melts at 128–129° C.

2.1 grams of S-methyl-isothioureido-methylene-cyanacetic acid ester are mixed with 20 cc. of an 0.5 N-solution of caustic soda, and the whole is heated for 10 minutes at 50° C. (the color of the solution changing from yellow to white). A small amount of insoluble matter is removed by filtering the mixture with suction, the filtrate is adjusted to a pH value of 1 with 1 N-hydrochloric acid, and the precipitate is filtered off with suction. The latter is recrystallized from a large amount of boiling ethanol. There is obtained 2-methylmercapto-4-hydroxy-5-cyano-pyrimidine of the formula

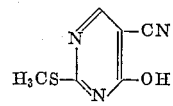

in the form of white crystals melting at 220–222° C.

*Example 2*

10 grams of 2-methylmercapto-4-hydroxy-5-cyano-pyrimidine are heated with 50 cc. of diethylamino-ethylamine for 3 hours at 150–160° C. The excess of diethyl-amino-ethylamine is then distilled off in vacuo, and the oil which remains behind is taken up in alcoholic hydrochloric acid. Upon cooling the mixture, the hydrochloride of 2-

(β-diethylaminoethylamino)-4-hydroxy-5-cyano-pyrimidine of the formula

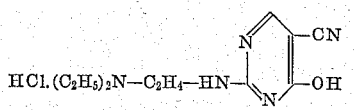

precipitates out in white crystals melting at 142° C. with decomposition.

*Example 3*

60 grams of 2-methylmercapto-4-hydroxy-5-cyano-pyrimidine are heated with 80 cc. of liquid dimethylamine in a closed tube for 6 hours at 90–100° C. After evaporating the excess of dimethylamine the residue is taken up in water. The mixture is filtered to remove insoluble matter, the filtrate is adjusted to a pH value of 7 with 2 N-hydrochloric acid, and again filtered with suction. By recrystallizing the precipitate from a large quantity of ethanol there is obtained 2-dimethylamino-4-hydroxy-5-cyano-pyrimidine of the formula

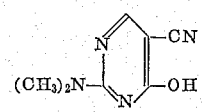

in the form of white crystals melting at 294–296° C.

*Example 4*

13 grams of 2-dimethylamino-4-hydroxy-5-cyano-pyrimidine are heated with 60 cc. of phosphorus oxychloride for 2 hours in a bath at 110° C. The phosphorus oxychloride is then removed by evaporation, the residue is introduced into ice water, the mixture is adjusted to a pH value of 8 with 2 N-caustic soda solution and extracted with chloroform. The residue remaining after evaporation of the chloroform is recrystallized from benzene. There is obtained 2-dimethylamino-4-chloro-5-cyano-pyrimidine of the formula

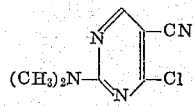

in the form of yellowish crystals melting at 149–150° C.

*Example 5*

18.2 grams of 2-dimethylamino-4-chloro-5-cyano-pyrimidine are introduced into a sodium methylate solution, prepared from 2.3 grams of sodium and 200 cc. of methanol, and the whole is heated at the boil for 4 hours. The mixture is allowed to cool and the precipitate is filtered off with suction. By recrystallizing the precipitate from benzene there is obtained 2-dimethylamino-4-methoxy-5-cyanopyrimidine of the formula

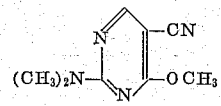

in the form of white crystals melting at 154–155° C.

*Example 6*

18.2 grams of 2-dimethylamino-4-chloro-5-cyano-pyrimidine are heated with an 8 N-solution in benzene of dimethylamine for 2 hours at 70–80° C. The whole is allowed to cool, the precipitated dimethylamine hydrochloride is filtered off with suction, the filtrate is evaporated to dryness, and the residue is crystallized from petroleum ether. 2:4-bis-dimethylamino-5-cyano-pyrimidine of the formula

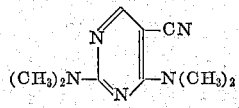

is obtained in the form of colorless crystals melting at 92–93° C. Its hydrochloride melts at 192–195° C.

*Example 7*

20 grams of furfurylamine are added to a solution of 18.2 grams of 2-dimethylamino-4-chloro-5-cyano-pyrimidine in 500 cc. of toluene and the whole is heated for 10 hours under reflux. Insoluble matter is removed by filtering the mixture with suction while hot, and the filtrate is evaporated in vacuo to 200 cc. The mixture is filtered with suction after being cooled. There is obtained 2-dimethylamino-4-furfurylamino-5-cyanopyrimidine of the formula

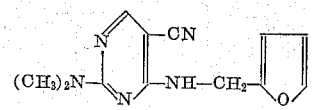

in the form of white crystals melting at 155–156° C.

*Example 8*

A solution of 18.2 grams of 2-dimethylamino-4-chloro-5-cyano-pyrimidine and 20 grams of N-methyl-piperazine in 150 cc. of acetone is heated in a closed tube for 4 hours at 120–130° C. The whole is then evaporated to dryness in vacuo, and the residue is crystallized from petroleum ether. 2-dimethylamino-4-(4'-methyl-piperazino)-5-cyano-pyrimidine of the formula

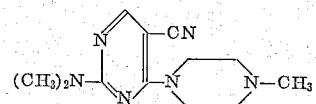

is obtained in the form of white crystals melting at 67–69° C.

*Example 9*

18.2 grams of 2-dimethylamino-4-chloro-5-cyanopyrimidine are heated with 50 cc. of dimethylamino-ethylamine for one hour at 150–160° C. The excess of diethylaminoethylamine is then distilled off in vacuo, water is added to the residue, the mixture is rendered strongly alkaline with a 2 N-solution of caustic soda, and the precipitate is filtered off with suction. The latter is recrystallized from petroleum ether. There is obtained 2-dimethylamino-4-(β-diethylaminoethylamino)-5-cyano-pyrimidine of the formula

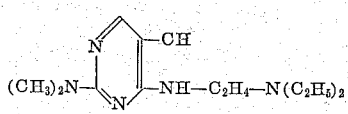

in the form of white crystals melting at 63–64° C. Its hydrochloride melts at 135–136° C. with decomposition.

*Example 10*

36 grams of 2-dimethylamino-4-chloro-5-cyano-pyrimidine are added to a suspension of the sodium salt of ortho-mercapto-para-chlorotoluene in 150 cc. of dioxane, and the whole is heated for 3 hours at the boil, while stirring. The mixture is filtered with suction to remove sodium chloride, the filtrate is evaporated to dryness in vacuo, and the residue is taken up in methylene chloride. The residue which remains behind after evaporating the methylene chloride is crystallized from ethanol, and in this manner there is obtained 2-dimethylamino-4-(5'-chloro-2'-methyl-phenylmercapto)-5-cyano-pyrimidine of the formula

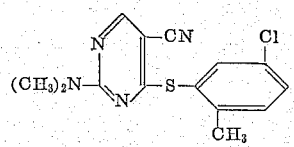

in the form of yellowish crystals melting at 138–141° C.

Example 11

A solution of 18.2 grams of 2-dimethylamino-4-chloro-5-cyanopyrimidine and 30 grams of para-chloraniline in 500 cc. of toluene is heated at the boil for 10 hours. The mixture is then evaporated to dryness in vacuo, a small amount of water is added and the mixture is adjusted to a pH value of 10 with a 2 N-solution of caustic soda, the mixture is filtered with suction, and the filter residue is crystallized from dimethyl-formamide. 2-dimethylamino-4-(para-chlorophenylamino)-5-cyano-pyrimidine of the formula

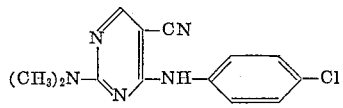

is obtained and melts at 233–234° C.

Example 12

10 grams of 2-methyl-mercapto - 4 - amino-5-cyanopyrimidine are heated with 70 cc. of liquid dimethylamine in a closed tube for 6 hours at 90–100° C. After evaporating the excess of dimethylamine, the residue is recrystallized from dimethyl-formamide. 2-dimethylamino-4-amino-5-cyanopyrimidine of the formula

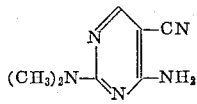

are obtained in the form of white crystals melting at 233–235° C. Its hydrochloride melts at 253–255° C. with decomposition.

The 2-methyl-mercapto - 4 - amino - 5-cyanopyrimidine used as starting material is obtained as follows:

Solutions of 11.2 grams of potassium hydroxide in 70 cc. of methanol and of 44 grams of S-methyl-isothiourea hydriodide in 200 cc. of methanol, both solutions being cooled to 0° C., are mixed together. 25 grams of ethoxymethylene-malonitrile are then added at a temperature of 8–12° C., the whole is stirred for a further two hours at room temperature, and the precipitate is filtered off with suction. The latter is recrystallized from a large amount of ethanol. There is obtained 2-methylmercapto-4-amino-5-cyanopyrimidine of the formula

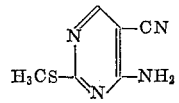

in the form of white crystals melting at 235–237° C.

Example 13

10 grams of 2-dimethylamino-4-amino-5-cyanopyrimidine are boiled for 3 hours under reflux with 200 cc. of a 2 N-solution of caustic soda and 200 cc. of ethanol. The whole is allowed to cool, and then the precipitated 2-dimethylamino-4-amino-5-carbamyl - pyrimidine of the formula

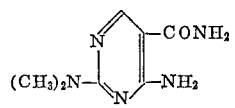

is filtered off with suction. It melts at 289–290° C. and it forms a hydrochloride melting at 293° C. with decomposition.

Example 14

16.3 grams of 2-dimethylamino-4-amino-5-cyanopyrimidine, 100 cc. of ethanol saturated with ammonia in the cold and 100 cc. of ethanol saturated in the cold with hydrogen sulfide are heated togther in a closed tube for 6 hours at 90–100° C. The crystalline magma which precipitates is then filtered off with suction, and crystallized from ethanol. There is obtained 2 - dimethylamino - 4 - amino-5-thiocarbamyl-pyrimidine of the formula

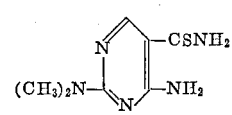

in the form of yellow crystals melting at 225–227° C.

Example 15

19.1 grams of 2:4-bis-dimethylamino-5-cyano-pyrimidine, 100 cc. of ethanol saturated with ammonia in the cold and 100 cc. of ethanol saturated with hydrogen sulfide in the cold are heated in a closed tube for 6 hours at 100° C. The crystalline magma which precipitates is then filtered off with suction, and crystallized from ethanol. There is obtained 2:4-bis-dimethyl-amino-5-thiocarbamyl-pyrimidine of the formula

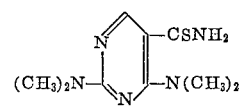

in the form of yellow crystals melting at 200–202° C.

Example 16

A suspension of 10 grams of 2 - methyl - mercapto-4-amino-5-cyano-pyrimidine in 20 grams of diethylamine is heated for 6 hours at 60° C. The solid residue is filtered off, washed with ether and recrystallized from dimethylformamide. There is obtained 2-di-ethylamino-4-amino-5-cyano-pyrimidine of the formula

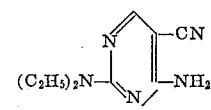

in the form of white lamellae melting at 237° C.

Example 17

20 grams of n-butylamine are added to 10 grams of 2-methylmercapto - 4 - amino-5-cyano-pyrimidine and the whole is boiled under reflux for 6 hours. A thick magma is formed to which 50 cc. of ether are added. The precipitate is filtered off and recrystallized from alcohol. There is obtained 2-n-butylamino-4-amino-5-cyano-pyrimidine of the formula

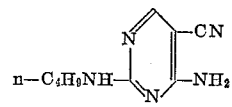

in the form of white crystals melting at 161° C.
The hydrochloride melts at 220–225° C.

Example 18

40 grams of N-methyl-piperazine are added to 20 grams of 2-methylmercapto-4-amino-5-cyano-pyrimidine and the whole is heated for 6 hours at 110° C. The precipitate is filtered and recrystallized from alcohol. 2-(N-methyl-N'-piperazine)-4-amino-5-cyano-pyrimidine of the formula

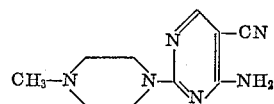

crystallizes in the form of needles melting at 189° C.
The hydrochloride melts at 308° C.

Example 19

20 grams of 2-methylmercapto-4-amino-5-cyano-pyrimidine are heated for 3 hours with 40 grams of piperidine at 115–120° C. A precipitate is formed which is filtered off and recrystallized from alcohol. There is obtained 2-piperidino-4-amino-5-cyano-pyrimidine of the formula

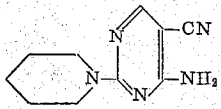

in the form of crystals melting at 219° C.

Example 20

20 grams of 2-methylmercapto-4-amino-5-cyano-pyrimidine are heated with 40 grams of β-dimethyl-amino-ethylamine for 6 hours at 110° C. The precipitate is filtered off and washed with ether. When crystallized from alcohol there is obtained 2-(β-dimethylamino-ethylamino)-4-amino-5-cyano-pyrimidine of the formula

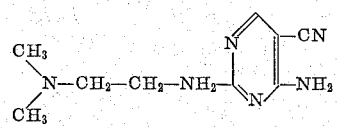

in the form of white prisms melting at 184–185° C.
The dihydrochloride melts at 242° C.

Example 21

20 grams of 2-piperidino-4-amino-5-cyano-pyridimide are boiled under reflux for 1 hour with 200 cc. of 2 N-sodium hydroxide solution and 200 cc. of alcohol. After cooling, the precipitated crystallizate is filtered with suction and purified by recrystallization from alcohol. The resulting 2-piperidino-4-amino-5-carbamyl-pyrimidine of the formula

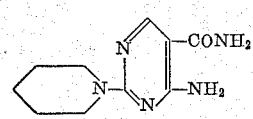

melts at 202–204° C.
The hydrochloride melts at 280–282° C.

Example 22

5 grams of 2-methylmercapto-4-amino-5-cyano-6-methylpyrimidine are heated with 20 cc. of dimethylamine for 6 hours at 100° C. in an autoclave. After evaporating the di-methylamine, the crystalline residue is recrystallized from a mixture of dimethyl formamide and water. There is obtained 2-dimethylamino-4-amino-5-cyano-6-methylpyrimidine of the formula

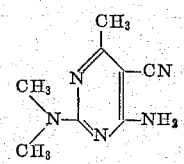

in the form of crystals melting at 202° C.
The 2-methylmercapto - 4 - amino-5-cyano-6-methyl-pyrimidine used as starting material can be prepared as follows:

A solution of 2.5 grams of sodium in 50 cc. of alcohol is added to 22 grams of methyl-isothiourea hydroiodide in 70 cc. of alcohol. 13 grams of β-ethoxy-α-cyano-crotonitrile are added and the whole is stirred for 2 hours at 15–20° C. The precipitate is filtered and recrystallized from a mixture of dimethyl formamide and alcohol. There is obtained 2-methylmercapto-4-amino-5-cyano-6-methylpyrimidine of the formula

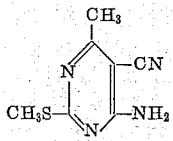

in the form of crystals melting at 237° C.

Example 23

A solution of 2.5 grams of sodium in 50 cc. of alcohol is added to a suspension of 27 grams of N:N-dimethyl-guanidine sulfate in 150 ml. of alcohol. After 30 minutes 12 grams of finely pulverized ethoxymethylene-malonitrile are added and the whole is stirred for 2 hours at room temperature. 100 cc. of water are then added to the reaction mixture and the precipitate filtered off and recrystallized from dimethyl formamide. There is obtained 2-dimethylamino-4-amino - 5 - cyano-pyrimidine of the formula

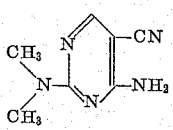

in the form of crystals melting at 235–237° C.

What is claimed is:
1. A member selected from the group consisting of a pyrimidine having the formula:

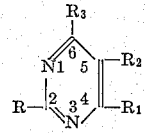

and therapeutically useful acid addition, alkali metal and alkaline earth metal salts thereof, wherein R represents a member selected from the group consisting of mono- and di-lower alkylamino, lower alkyleneimino and lower alkyleneimino which carbon chain is interrupted by a member of the group consisting of oxygen, sulfur and nitrogen, $R_1$ stands for a member selected from the group consisting of R, halogen, hydroxy, mercapto, hydrazino, lower alkoxy, R-lower alkylamino, R-lower alkoxy, lower alkyl-mercapto, hydroxy-lower alkylamino, lower cycloalkylamino containing 5 to 6 ring carbon atoms, phenyl-amino, (mono-chlorophenyl)-amino, benzylamino, furfurylamino, phenylmercapto and (mono-chlorotolyl)-mercapto, $R_2$ represents a member of the group consisting of carboxy, carbo-lower alkoxy, cyano and the groups $CONH_2$ and $CSNH_2$ and $R_3$ stands for a member selected from the group consisting of hydrogen and lower alkyl.
2. 2 - dimethylamino - 4 - hydroxy-5-cyano-pyrimidine.
3. 2 - dimethylamino-4-chloro-5-cyano-pyrimidine.
4. 2 - dimethylamino-4-(4′-methyl-piperazino)-5-cyano-pyrimidine.
5. 2:4-bis-(di-lower alkylamino)-5-cyano-pyrimidine.
6. 2 - di-lower alkyl-amino-4-hydroxy-5-cyano-pyrimidine.
7. 2 - di - lower alkylamino-4-halogeno-5-cyano-pyrimidine.
8. 2,4-bis-dimethylamino-5-cyano-pyrimidine.
9. 2-para-chloranilino-4-hydroxy-5-cyano-pyrimidine.
10. 2 - (β - diethylamino-ethylamino) - 4 - hydroxy-5-cyano-pyrimidine.

References Cited by the Examiner
UNITED STATES PATENTS

| | | | |
|---|---|---|---|
| 2,437,682 | 3/48 | Curd et al. | 260—256.4 |
| 2,437,683 | 3/48 | Curd et al. | 260—256.4 |
| 2,443,304 | 6/48 | Curd et al. | 260—256.4 |
| 2,698,326 | 12/54 | Suter et al. | 260—256.5 |

(Other references on following page)

UNITED STATES PATENTS 2,949,466 8/60 Hoefle et al. _____ 260—256.4

FOREIGN PATENTS 583,815 12/46 Great Britain.
587,548 4/47 Great Britain.
587,550 4/47 Great Britain.

OTHER REFERENCES

Johnson et al.: Amer. Chem. Jour., vol. 42, pages 505–511 (1909).

Middleton: Jour. Amer. Chem. Soc., vol. 80, pages 2829–2832 (1958).

Morton: The Chemistry of Heterocyclic Compounds, page VI of the preface.

Suter et al.: Chemical Abstracts, vol. 50, p. 1093 (1956).

IRVING MARCUS, *Primary Examiner.*

H. J. LIDOFF, NICHOLAS S. RIZZO, WALTER A. MODANCE, *Examiners.*